United States Patent
Carr et al.

(10) Patent No.: US 11,891,762 B2
(45) Date of Patent: Feb. 6, 2024

(54) SYSTEMS AND METHODS FOR CONTROLLING OPERATION OF A MILLING MACHINE BASED ON VIBRATION

(71) Applicant: Caterpillar Paving Products Inc., Brooklyn Park, MN (US)

(72) Inventors: Robert Edwin Carr, Sebastian, FL (US); Paul J. Koenen, Andover, MN (US); Gianfranco Perri, Bologna (IT); Nathan Louis Mashek, Albertville, MN (US)

(73) Assignee: Caterpillar Paving Products Inc., Brooklyn Park, MN (US)

( * ) Notice: Subject to any disclaimer, the term of this patent is extended or adjusted under 35 U.S.C. 154(b) by 133 days.

(21) Appl. No.: 17/543,748

(22) Filed: Dec. 7, 2021

(65) Prior Publication Data
US 2023/0175212 A1    Jun. 8, 2023

(51) Int. Cl.
*E01C 23/088* (2006.01)
*E01C 23/12* (2006.01)

(52) U.S. Cl.
CPC ......... *E01C 23/088* (2013.01); *E01C 23/127* (2013.01); *G05B 2219/37434* (2013.01)

(58) Field of Classification Search
CPC ...... E01C 23/088; E01C 23/127; E21C 39/00; G05B 2219/37434; G05B 2219/37634
USPC ................................... 299/1.1, 1.2
See application file for complete search history.

(56) References Cited

U.S. PATENT DOCUMENTS

| | | | |
|---|---|---|---|
| 4,143,552 A * | 3/1979 | Godfrey | E21C 35/10 299/1.1 |
| 5,092,657 A * | 3/1992 | Bryan, Jr. | E21C 35/10 299/1.1 |
| 9,234,422 B2 | 1/2016 | Hall | |
| 9,879,391 B2 | 1/2018 | Berning et al. | |
| 9,956,842 B2 | 5/2018 | Muir et al. | |
| 11,091,887 B1 | 8/2021 | Hogan | |
| 2005/0207841 A1* | 9/2005 | Holl | E01C 23/088 404/94 |
| 2010/0063691 A1* | 3/2010 | Hall | E21C 35/24 701/50 |
| 2011/0268503 A1* | 11/2011 | Hall | E01C 23/01 404/90 |
| 2013/0035874 A1* | 2/2013 | Hall | E01C 23/088 702/34 |
| 2013/0234494 A1 | 9/2013 | Hall et al. | |

(Continued)

*Primary Examiner* — Abby J Flynn
*Assistant Examiner* — Michael A Goodwin
(74) *Attorney, Agent, or Firm* — Xsensus, L.L.P.

(57) ABSTRACT

Systems and methods can sense, using a vibration sensor disposed relative to a rotor of a milling machine, vibration associated with a cutting operation of the rotor of the milling machine; and determine during the cutting operation whether the sensed vibration associated with the cutting operation of the rotor indicates now that the rotor is cutting a second material different from a first material being previously cut by the rotor during the cutting operation. The second material can be harder than the first material. Cutting operations of the milling machine can be controlled based on identification of the rotor cutting the second material. The cutting operations can include speed of the milling machine, cutting level and/or depth of the rotor, and/or rotational speed of the rotor.

17 Claims, 3 Drawing Sheets

(56) References Cited

U.S. PATENT DOCUMENTS

2017/0356142 A1* 12/2017 Berning .................. E21C 31/02
2021/0209870 A1*  7/2021 Thomas ................ E01C 19/004
2021/0254464 A1*  8/2021 Niederriter ......... G01M 5/0066

* cited by examiner

SYSTEMS AND METHODS FOR CONTROLLING OPERATION OF A MILLING MACHINE BASED ON VIBRATION

TECHNICAL FIELD

The present disclosure relates generally to methods and systems regarding a milling machine, and more particularly to methods and systems for controlling operation of a milling machine based on vibration.

BACKGROUND

Ground and base may have different stiffness that can also vary based on depth. During milling application, an operator may have to set and control the machine parameters to optimize machine performance, fuel consumption, and/or wear of tools based on his or her own experience. Also, in a certain job site, a concrete layer may be present underneath the asphalt and it may be required to not rip off the concrete layer. This can require the operator to level/adjust the machine grade and setting. These operations may have to be done manually and rely on operator expertise.

U.S. Patent Pub. No. 2013/0234494 ("the '494 patent publication") describes a degradation assembly in the context of a road milling machine. According to the '494 patent publication, the degradation assembly may be capable of detecting and determining the location of a selected pick mounted on a drum based on measuring impacts on at least one pick with at least one sensor. The '494 patent publication describes that the sensors may be strain gauges, accelerometers, or acoustic sensors.

SUMMARY

According to an aspect of the present disclosure, a method can comprise: sensing, in real time, using a vibration sensor disposed relative to a rotor of a milling machine, vibration associated with a cutting operation of the rotor of the milling machine; determining during the cutting operation, using a processor, in real time, whether the sensed vibration associated with the cutting operation of the rotor indicates a change in material hardness of material being cut by the rotor during the cutting operation based on vibration data from said sensing the vibration, the change in material hardness being above a predetermined hardness threshold amount; and controlling, using the processor, cutting operations of the milling machine when said determining indicates the change in the material hardness. The controlling the cutting operations can include controlling speed of the milling machine moving in a cutting direction, cutting level and/or depth of the rotor, and/or rotational speed of the rotor.

According to another aspect of the present disclosure, a non-transitory computer-readable storage medium having stored thereon instructions that, when executed by one or more processors, causes the one or more processors to perform a method is described, can be provided, or may be implemented. The method can comprise: receiving vibration data from a vibration sensor disposed relative to a rotor of a milling machine, the vibration sensor sensing vibration associated with a cutting operation of the rotor of the milling machine; determining during the cutting operation that the cutting operation has transitioned from the rotor cutting a first material to the rotor cutting a second material that is harder than the first material by a predetermined hardness threshold amount; and controlling cutting operations of the milling machine responsive to said determining indicating that the cutting operation has transitioned from the rotor cutting the first material to the rotor cutting the second material. The controlling the cutting operations of the milling machine can include controlling speed of the milling machine moving in a cutting direction, cutting level or depth of the rotor, and/or rotational speed of the rotor.

According to yet another aspect of the present disclosure a cold planer is disclosed or can be provided. The cold planer can comprise: a rotor supported by a frame of the cold planer; a rotor housing, supported by the frame of the cold planer, to house the rotor at least partially within an internal volume of the rotor housing; an accelerometer to sense vibrations associated with a cutting operation of the rotor, the accelerometer being disposed adjacent to the rotor, on the rotor housing but outside of the internal volume of the rotor housing, where during the cutting operation the cold planer is moving in a cutting direction; and circuitry operatively coupled to the accelerometer and the rotor. The circuitry can be configured to receive vibration amplitude data and vibration frequency data from the accelerometer during the cutting operation of the rotor, with the vibration amplitude data and/or vibration frequency data at or above a first predetermined level indicating that the cutting operation is being performed with respect to a first material, determine whether the vibration amplitude data and/or the vibration frequency data spikes above a second predetermined level indicating that the cutting operation is being performed with respect to a second material harder than the first material, identify the second material based on the vibration amplitude data and/or the vibration frequency data above the second predetermined level, and control cutting settings of the cold planer based on the identified second material to achieve a target cutting setting for the cutting operation in the second material. The second predetermined level can be based on a speed of travel of the cold planer in the cutting direction during the cutting operation and a rotational speed of the rotor during the cutting operation occurring at a same time.

DETAILED DESCRIPTION

The present disclosure relates generally to methods and systems for controlling operation of a milling machine based on vibration.

Figure 1:
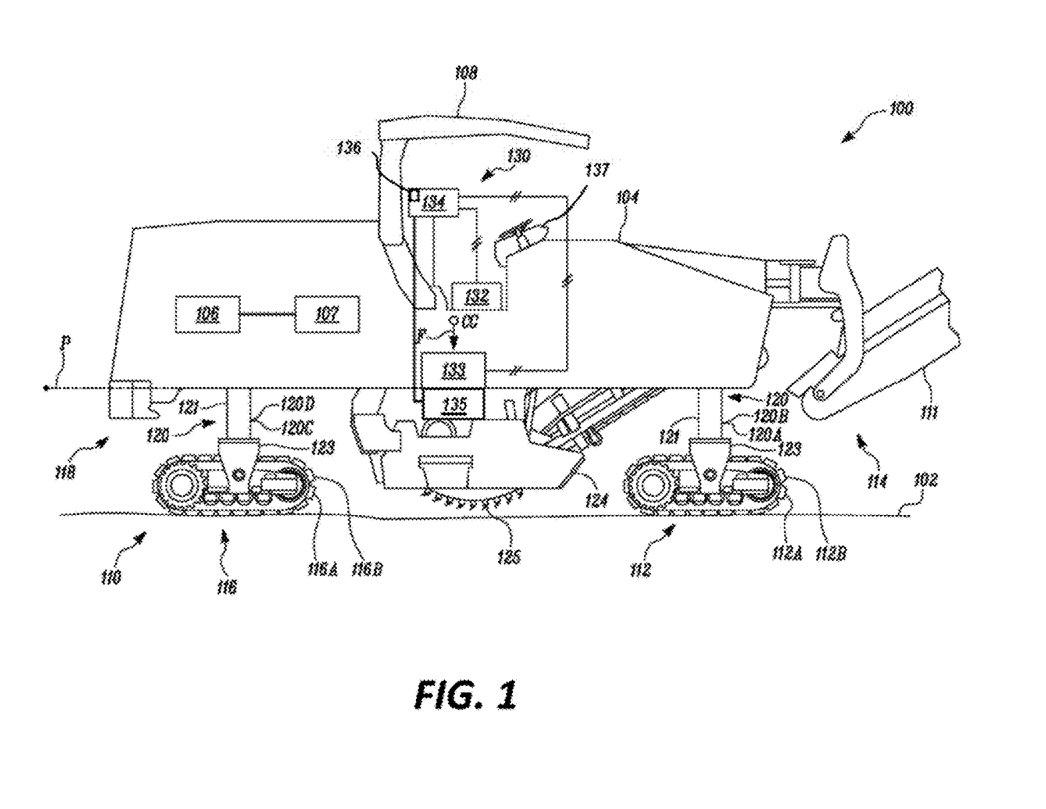
FIG. 1 is a diagram of a representative milling machine according to one or more embodiments of the disclosed subject matter.

FIG. 1 illustrates a side view of an exemplary milling machine 100 used for performing various earth moving operations, such as milling of a ground surface 102. The milling machine 100, as an example, may be a cold planer such as illustrated in FIG. 1, though embodiments of the disclosed subject matter are not so limited. Generally, the milling machine 100 may be used for removing material from the ground surface 102. Examples of the material of the ground surface 102 include pavement, asphalt, concrete, limestone, granite, or a combination of two or more of these materials, for instance, homogenously or substantially homogenously provided.

The milling machine 100 can include a frame 104 to support various components of the milling machine 100, such as an engine 106 and an operator cab 108. The engine 106 can provide power to propel the milling machine 100 over the ground surface 102. The milling machine 100 can further include a hydraulic system 107 operably connected to the engine 106. The hydraulic system 107 can drive a ground engaging member 110 of the milling machine 100. The hydraulic system 107 can also drive various other systems of the milling machine 100, such as a steering system and a conveyor system 111 of the milling machine 100. The conveyor system 111 can be used for transporting the material removed from the ground surface 102 to a truck, for instance. The operator cab 108 may include a control console having various operating control levers, switches, and the like for controlling travel and milling operation of the milling machine 100.

The ground engaging member 110 can be coupled to the frame 104 and can engage with the ground surface 102 to move the milling machine 100 over the ground surface 102. In the illustrated embodiment, the milling machine 100 can include a first set of ground engaging members 112 disposed adjacent to a front end 114 of the milling machine 100. The first set of ground engaging members 112 can include a first ground engaging member 112A and a second ground engaging member 112B (behind the first ground engaging member 112A in FIG. 1). The milling machine 100 can further include a second set of ground engaging members 116 disposed adjacent to a rear end 118 of the milling machine 100. The second set of ground engaging members 116 can include a third ground engaging member 116A and a fourth ground engaging member 116B (behind the third ground engaging member 116A in FIG. 1). The first and second sets of ground engaging members 112, 116 can be tracks, for instance. In other embodiments, the first and second sets of ground engaging members 112, 116 may be wheels.

In an embodiment, the first, second, third, and fourth ground engaging members 112A, 112B, 116A, 116B can be coupled to the frame 104 by multiple vertically adjustable legs 120, for instance. The first ground engaging member 112A can be coupled to the frame 104 by a first leg 120A. Similarly, the second, third, and fourth ground engaging members 112B, 116A, 116B can be coupled to the frame 104 by a second leg 120B, a third leg 120C, and a fourth leg 120D, respectively. Each of the first leg 120A, the second leg 120B, the third leg 120C, and the fourth leg 120D can extend and retract along a length thereof to adjust the height of the frame 104 relative to the ground surface 102. The vertically adjustable legs 120 may raise or lower individually or collectively.

In an example, the first leg 120A may include a cylinder body mounted on the frame 104 and a piston body 121 may be slidably disposed within the cylinder body. The cylinder body may be fluidly communicated with the hydraulic system 107. The piston body 121 may be moved between an extended position and a retracted position upon actuation of the hydraulic system 107. A maximum value of the length of the first leg 120A may be defined by the extended position of the piston body 121. Similarly, a minimum value of the length of the first leg 120A may be defined by the retracted position of the piston body 121. The extended position of the piston body 121 may correspond to lifting of the frame 104 and the retracted position of the piston body 121 may correspond to lowering of the frame 104. The piston body 121 may be further coupled to a mounting member 123 for supporting the first ground engaging member 112A. The mounting member 123 may operatively couple the first ground engaging member 112A. The second leg 120B, the third leg 120C, and the fourth leg 120D may be the same (or substantially the same) as the first leg 120A.

The ground engaging members 110 may include a drive motor or drive motors (e.g., hydraulic) communicated with the hydraulic system 107. Upon actuation of the hydraulic system 107, the hydraulic drive motor(s) may drive a track link that is in contact with the ground surface 102. Similarly, as noted above, the second, third, and fourth ground engaging members 112B, 116A, 116B and the second, third, and fourth legs 120B, 120C, 120D may be in communication with the hydraulic system 107 to move the milling machine 100 over the ground surface 102 and to raise or lower the frame 104 with respect to the ground surface 102. Each of the first, second, third and fourth legs 120A, 120B, 120C, 120D may be independently actuated by the hydraulic system 107 to raise or lower the frame 104 with respect to the ground surface 102.

In other embodiments, each of the first, second, third, and fourth ground engaging members 112A, 112B, 116A, 116B may be coupled to the frame 104 by a height adjustable linkage mechanism. Furthermore, each of the height adjustable linkage mechanisms may be configured to raise or lower a corresponding ground engaging member 112A, 112B, 116A, 116B relative to the frame 104. One or more level sensors may be disposed on the milling machine 100 to determine a slope or stability measurement of the milling machine 100 with reference to the ground surface 102. Further, the one or more level sensors may be configured to determine positions of the ground engaging members 112A, 112B, 116A, 116B with reference to the frame 104 of the milling machine 100. The height adjustable linkage mechanism may be actuated by the hydraulic system 107. Alternatively, the height adjustable linkage mechanism may be actuated by the hydraulic system 107 in combination with an electric system of the milling machine 100. The height adjustable linkage mechanism may be selectively actuated to raise or lower the first, second, third, and fourth ground engaging members 112A, 112B, 116A, 116B individually or collectively.

The milling machine 100 can further include a rotor housing 124 attached to the frame 104. The rotor housing 124 may also be known or referred to as a cutter box. In the illustrated embodiment, the rotor housing 124 can be attached to the frame 104 between the first and second set of ground engaging members 112, 116. In other embodiments, the rotor housing 124 may be disposed adjacent to the rear end 118 of the milling machine 100.

A rotor 125, which can be a drum-shaped cylindrical structure that includes a plurality of cutting teeth or picks disposed about the cylindrical surface, can be rotatably disposed within the rotor housing 124 and operably coupled to the engine 106 by a drive train. The rotor 125 may also be referred to as a cutter drum. According to one or more embodiments, the rotor 125 can be mounted to the rotor housing 124, for instance, such that the rotor 125 is at least partially within an internal volume defined by the rotor housing 124. The cutting teeth may be replaceable, for instance, upon reaching a predetermined wear condition (e.g., wear of a certain amount or type) or based on a particular material of the ground surface 102.

The rotor 125 can be rotatably provided within the rotor housing 124 and may be configured to engage with (e.g., penetrate) the ground surface 102 to perform a cutting operation on the ground surface 102. The cutting operation may be referred to as milling or planning. As an example, the rotor 125 may be controlled to spin at or about at a rate of 120 rpms. During operation of the milling machine 100, for instance, when the milling machine 100 is moving in a cutting direction whereby the rotor 125 is cutting the ground surface 102, the rotor housing 124 may make contact with the resultant material produced from the rotor 125 cutting the ground surface 102. The rotor 125 cutting the ground surface 102, for instance, as the milling machine 100 moves toward uncut portions of the ground surface 102, can be referred to herein or characterized as a cutting operation of the rotor 125 (or the milling machine 100).

To bring the rotor 125 into and out of contact with the ground surface 102, the milling machine 100 can include a rotor elevation mechanism adapted to vertically raise and lower the frame 104, including the rotor 125 rotatably supported thereon, with respect to the ground surface 102. For instance, the adjustable legs 120 can be actuated to extend and retract in a telescoping manner, thereby either bringing the frame 104 and the rotor 125 closer to or farther from the ground surface 102. The adjustable legs 120 can thereby control the depth-of-cut into the ground surface 102.

The conveyor system 111 can be disposed adjacent to the front end 114 of the milling machine 100 and can be coupled to or within proximity of the rotor housing 124 to receive the material removed from the ground surface 102 due to the cutting operation of the rotor 125. To remove material as the rotor 125 breaks apart the ground surface 102 during cutting operations, the conveyor system 111 can use a conveyor assembly that may include one or more conveyors (e.g., a pickup conveyor and a discharge conveyor 132). The conveyor system 111 can discharge the cut material to a dump truck or the like traveling ahead of the milling machine 100.

The milling machine 100 can further include a system 130 for controlling slope or stability of the milling machine 100 with respect to the ground surface 102. The system 130 can be disposed in the milling machine 100 to control the stability thereof during travel of the milling machine 100 over the ground surface 102 and milling operation of the milling machine 100. The system 130 can control the slope of the milling machine 100 during operation and movement.

The system 130 can include a sensing unit 132, which may include or be characterized as one or more sensors, disposed on the frame 104. The sensing unit 132 can generate a signal (or signals) indicative of the slope of the milling machine 100. The slope of the milling machine 100 may be defined with respect to a movement of the milling machine 100 about a longitudinal axis and/or a transverse axis of the milling machine 100. The longitudinal axis may extend across a length of the milling machine 100 and the transverse axis may extend across a width of the milling machine 100. The slope of the milling machine 100 can be further defined with respect to a movement of the milling machine 100 and with respect to a horizontal plane 'P' perpendicular to a direction of a gravitational force 'F' of the milling machine 100. The gravitational force 'F' may correspond to a force caused by a weight of the milling machine 100 at a center of gravity 'CG' thereof towards the ground surface 102. The horizontal plane 'P' may be hereinafter referred to as the reference plane 'P'.

In the illustrated embodiment, the sensing unit 132 can be located on the frame 104 between the first set of ground engaging members 112 and the second set of ground engaging members 116. Furthermore, the sensing unit 132 may be centered on the frame 104 between the first and second set of ground engaging members 112, 116. In another embodiment, the sensing unit 132 may be disposed on the frame 104 around an intersecting location defined by the longitudinal axis and the transverse axis of the milling machine 100. In other embodiments, the sensing unit 132 may be disposed at any location in the frame 104 to generate the signal(s) indicative of the slope of the milling machine 100. In yet another embodiment, a plurality of the sensing units 132 may be disposed at various locations in the frame 104 of the milling machine 100.

In an example, the sensing unit 132 may be or include a gyro sensor. The gyro sensor may generate signals indicative of rotational attributes of the milling machine 100, such as a pitch and a roll. The pitch may correspond to the movement of the milling machine 100 about the transverse axis and the roll may correspond to the movement of the milling machine 100 about the longitudinal axis. In various examples, the sensing unit 132 may include a sensor device, an angle measurement device, a force balancing member, a solid state member, a fluid filled device, an accelerometer, a tilt switch or any other device that can determine the slope of the milling machine 100 with respect to one or more of the various reference parameters including, but not limited to, the longitudinal axis, the transverse axis of the milling machine 100, the reference plane 'P', and/or the ground surface 102.

The system 130 can further include a level sensor 133 disposed on the frame 104 of the milling machine 100. The level sensor 133 may be disposed at any location in the milling machine 100. The level sensor 133 can generate a signal (or signals) indicative of a slope or stability of the milling machine 100 with reference to the ground surface 102. The slope of the milling machine 100 with reference to the ground surface 102 may be defined based on the reference plane 'P' of the milling machine 100.

At least one vibration sensor 135 can be provided relatively close to the rotor 125, for instance, in or on the rotor housing 124. Optionally, the vibration sensor 135 can be or include an accelerometer. The vibration sensor(s) 135 can be part of the system 130, according to one or more embodiments of the disclosed subject matter. Generally, the vibration sensor 135 can convert physical vibrations to electrical signals representative of the physical vibrations. Such vibrations can be caused by the rotor 125 cutting into the ground surface 102 whereby the surface on which the vibration sensor 135 is mounted is caused to vibrate or the vibration sensor 135 is otherwise caused to vibrate.

The vibration sensor 135 can be provided inside the rotor housing 124, for instance, so long as the vibration sensor 135 is positioned or otherwise provided such that debris produced from the rotor 125 cutting the ground surface 102 does not impact operation of the vibration sensor 135. Alternatively, the vibration sensor 135 can be mounted outside (e.g., on an external wall of the rotor housing 124) as close to the rotor 125 as possible. The vibration sensor 135 can be positioned in proximity to the rotor 125 because this may be where the greatest vibration (e.g., amplitude and/or frequency) is produced. This may also be where the greatest accuracy in sensing vibration can be achieved. The vibration sensor 135 can output vibration signals representative of sensed vibration. Such vibration signals can be referred to or characterized as vibration data and may include vibration amplitude data and/or vibration frequency data as characterizations of the sensed vibrations.

A controller 134 (diagrammatically shown in FIG. 1) can be provided as part of the milling machine 100. The controller 134 may be part of the system 130, according to one or more embodiments of the disclosed subject matter. The controller 134, or portions thereof, may be characterized as or implemented in or using circuitry.

The controller 134 can be disposed within the operator cab 108. However, in other embodiments, the controller 134 may be disposed at any location in the frame 104. The controller 134 may include memory 136 (one or more computer-readable memories) to store various input and output data. The memory 136, which may be non-transitory computer-readable memory, can also store computer-readable instructions that when read by one or more processors (e.g., of the controller 134) can cause the controller 134 to perform operations or methods according to one or more embodiments of the disclosed subject matter. Vibration data from the vibration sensor 135 can be received by the controller 134 and stored in the memory 136. Though the memory 136 is shown in side the controller 134, embodiments of the disclosed subject matter are not so limited. Rather, the controller 134 may access (store to and/or read from) the memory 136 whether inside or outside of the controller 134.

The controller 134 can be in communication with the sensing unit 132. The controller 134 can receive the signal(s) indicative of the slope of the milling machine 100 about the longitudinal axis and the transverse axis thereof generated by the sensing unit 132. The controller 134 can further communicate with the level sensor 133 to receive the signal(s) generated by the level sensor 133.

The controller 134 can be in communication with the vibration sensor 135. The controller 134 can receive signal(s) from the vibration sensor 135 indicative of vibrations associated with cutting operations of the rotor 125 during a milling or cutting operation of the milling machine 110. As noted above, such vibration signals may be characterized as vibration data. Hence, the controller 134 can receive vibration data from the vibration sensor 135. Such vibration data 135 can be received in real time. The vibration data can also be processed by the controller 134 in real time.

The controller 134 can also be in communication with the rotor 125 to control operation of the rotor 125. For instance, the controller 134 can control rotational speed of the rotor 125 during cutting operations. The controller 134 can also receive signals from or associated with operation of the rotor 125, such as rotor rotational speed from a sensor that sensors rotational speed of the rotor 125.

The controller 134 can also be in communication with the hydraulic system 107. In an example, the hydraulic system 107 may include a reservoir for containing a hydraulic fluid and one or more pumps to communicate the hydraulic fluid with the ground engaging member 110 and the legs 120. One or more direction control valves may be disposed in the hydraulic system 107 to control direction of flow of the hydraulic fluid. Furthermore, additional control valves, such as check valves, pressure relief valves, pressure regulating valves, and the like may be disposed in the hydraulic system 107 for generating required hydraulic power for actuation of the ground engaging members 110 and the legs 120. The controller 134 may be in communication with the one or more directional control valves and one or more additional control valves to control the flow of the hydraulic fluid to each of the first, second, third, and fourth ground engaging members 112A, 112B, 116A, 116B and the first, second, third, and fourth legs 120A, 120B, 120C, 120D. Thus the hydraulic system 107 in communication with the controller 134 can actuate each of the first, second, third, and fourth ground engaging members 112A, 112B, 116A, 116B and the first, second, third, and fourth legs 120A, 120B, 120C, 120D individually based on an input (e.g., control signaling) received from the controller 134.

An operator interface 137 may be provided, for instance, in the operator cab 108, such that an operator may provide input(s) to the controller 134, such as control inputs, information inputs, etc., and may retrieve output data from the controller 134 through the operator interface 137. The operator interface 137 may include various control buttons, switches, display(s), and the like.

Figure 2:
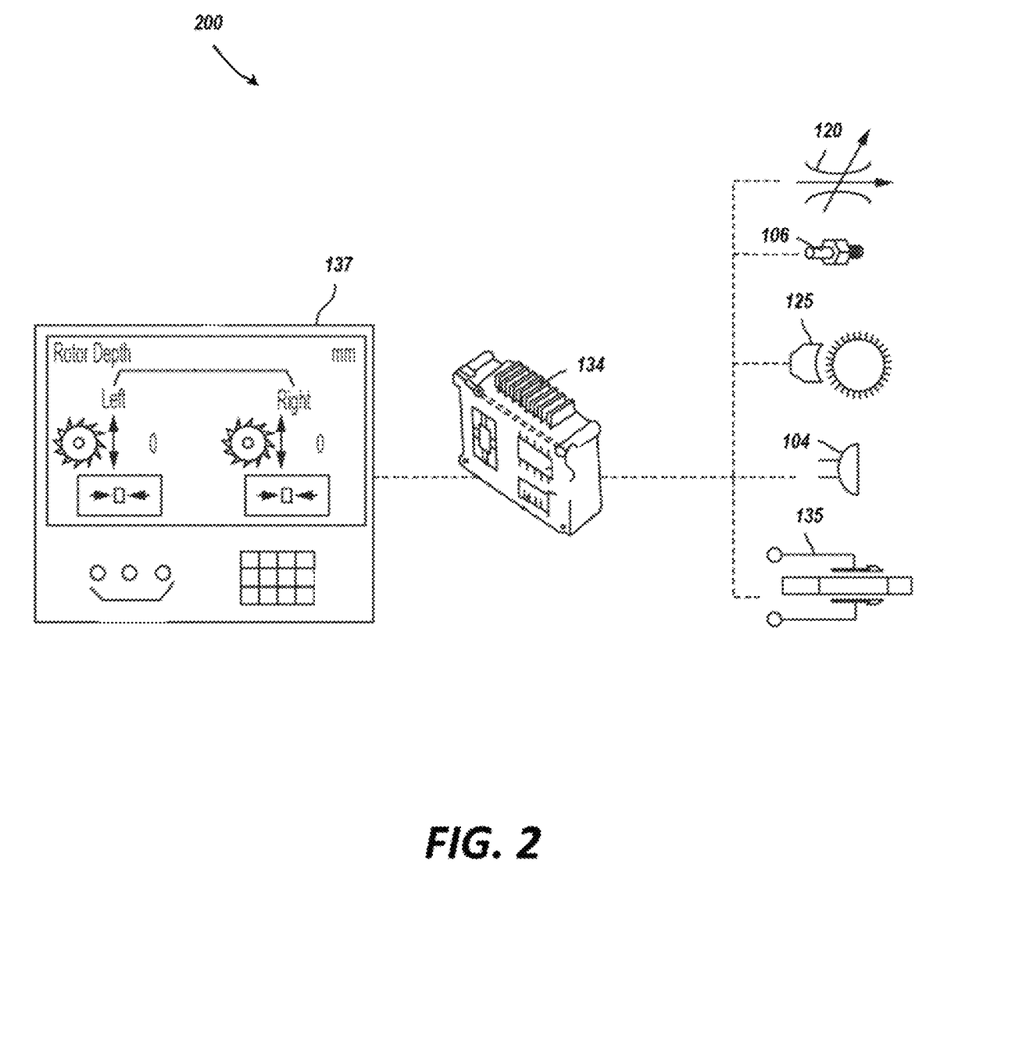
FIG. 2 is a diagram of a control system for a milling machine according to one or more embodiments of the disclosed subject matter.

FIG. 2 shows a diagram of a control system 200 according to one or more embodiments of the disclosed subject matter. The control system 200 can include the controller 134, the operator interface 137, and one or more inputs, such as inputs from the vibration sensor 135 (as well as other sensors, such as the level sensor 133), the rotor 125 (e.g., a rotor rotational speed sensor), the adjustable legs 120 and/or the rotor housing 124 (e.g., elevation- or cutting height-related signals), the engine 106 (e.g., engine speed signals), and the ground engaging members 110 or the frame 104 in general (e.g., travel speed signals for the milling machine 100).

According to one or more embodiments, the system 200 can identify a transition of material for the ground surface 102 during the cutting operation of the milling machine 100 and/or control operations of the milling machine 100 based on measurements from one or more vibration sensors 135 provided in proximity to the rotor 125 of the milling machine 100.

For instance, the controller 134 can determine, during the cutting operation of the milling machine 100, in real time, for instance, that the rotor 125 is cutting a particular material. This can represent a transition from cutting in one material to now cutting in another material. According to embodiments of the disclosed subject matter, the one or first material may be softer than the second material. Put another way, the second material can be harder than the first material. For instance, the first material may be soft asphalt and the second material may be concrete.

The determination of cutting in the second material, for instance, the transition from cutting the first material to cutting the second material, can be performed by the controller 134 based on vibration data from the vibration sensor 135. As noted above, the vibration data can include or otherwise be processed (e.g., by the controller 134) to acquire vibration amplitude data and/or vibration frequency data associated with operation of the rotor 125 during the cutting operation, including the transition from cutting the first material to cutting the second material.

In the case of cutting in harder material compared to cutting in softer material, the vibration may be greater when cutting in the harder material than when cutting in the softer material. The vibration amounts may be used to identify that the rotor 125 is now cutting into the harder material. For instance, the harder material may be associated with a certain vibration amount (or amounts), such as vibration amplitude and/or vibration frequency. The certain vibration amount may be referred to as a predetermined vibration level or a predetermined hardness threshold amount.

Additionally or alternatively, the difference in vibration can distinguish the two materials from each other in terms of relative vibration. For instance, vibration characteristics associated with the softer material, such as vibration amplitude and/or vibration frequency, may be known to be a predetermined amount below or less than corresponding vibration characteristics associated with the harder material. Such difference in vibration may correlate to an amount by which material hardness between the two differs. Thus, the comparison of vibration characteristics may be used to identify that the rotor 125 is now cutting into the harder material. The difference in vibration between the two materials may additionally or alternatively be referred to as the predetermined vibration level or the predetermined hardness threshold amount.

Accordingly, the vibration amplitude data and/or the vibration frequency data from the vibration sensor 135 may be greater when cutting in the harder material than when cutting in the softer material. For instance, as alluded to above, the vibration amplitude data and/or the vibration frequency data from the vibration sensor 135 may be greater when cutting in the harder material than when cutting in the softer material by a predetermined amount (predetermined hardness threshold amount). Additionally or alternatively, the vibration amplitude data and/or the vibration frequency data when cutting in the harder material may fall within a predetermined range above a predetermined range of the softer material. Such threshold amounts may prevent inadvertent transition identifications due to vibration increase that may not reach the necessary predetermined vibration level or threshold amount. The controller 134 may also identify what the second material is or the type of second material (e.g., concrete) based on the specific values of vibration amplitude and/or vibration frequency from the vibration amplitude data and/or the vibration frequency data from the vibration sensor 135.

Additionally or alternatively, the controller 134 can determine whether the rotor 125 is cutting in the second material based on comparing historical vibration data to current vibration data from the vibration sensor 135. For instance, the controller 134 can retrieve historical vibration data from the memory 136 and make comparisons to the current vibration data from the vibration sensor 135. This can involve comparing a current vibration pattern or profile (e.g., amplitude and/or frequency) to one or more historical vibration patterns or profiles. Such vibration pattern may focus on spikes of the vibration pattern. Hence, the vibration pattern may be referred to or characterized as a spike pattern. Generally, vibrations for softer material may have relatively more continuity (e.g., less spikes above a predetermined value) than vibrations for harder materials (e.g., more spikes above the predetermined value).

Such historical vibration patterns may include historical data of the milling machine 100 previously cutting in the first material and/or historical data of vibration patterns for one or more other materials (which may include the second material). The controller 134 may also identify what the second material is or the type of second material (e.g., concrete) based on the current vibration pattern.

Optionally, the first material may already be known to the controller 134. For instance, prior to identifying the transition to cutting the second material, the controller 134 may have already identified the first material, i.e., already identified what the first material is or the type of first material (e.g., asphalt). Additionally or alternatively, identification of the first material can merely mean identification that the rotor 125 is cutting in the first material. Here, the cutting in the first material may cause vibration of the rotor 125 to increase, for instance, from a situation where the rotor 125 is not cutting into any material. This may be referred to as a scratch transition.

Similar to above, a predetermined level or hardness threshold amount (or range) may be associated with the rotor 125 transitioning to cutting into the first material as the initial material. Thus, cutting in the first material can have associated therewith a first predetermined vibration level or hardness threshold (or range) and cutting in the second material can have associated therewith a second predetermined vibration level or hardness threshold (or range) greater than the first predetermined vibration level or hardness threshold (or range) and such levels/thresholds (or ranges). As noted above, the predetermined levels/hardness thresholds can be a predetermined amount away from each other.

Whether dealing with the predetermined vibration levels or hardness thresholds (or ranges) and/or the vibration patterns, the levels/thresholds and patterns may change based on operating parameters of the milling machine 100. For instance, the predetermined levels/thresholds may each change based on the speed of travel of the milling machine 100 and/or the rotational speed of the rotor 125 during the cutting operation. As an example, the frequency and amplitude of the vibration may increase when the travel speed of the milling machine 100 increases during the cutting operation or relative to another cutting operation. The frequency and amplitude of the vibration may also increase when the rotational speed of the rotor 125 increases during the cutting operation or relative to another cutting operation. Thus, the predetermined vibration level or hardness threshold may be set based on the travel speed of the milling machine 100 and/or the rotational speed of the rotor 125. The deepness or cut depth of the rotor 125 may also affect vibration. Thus, the predetermined vibration levels hardness thresholds (or ranges) and/or the vibration patterns may also change based on the deepness of the cut or the cut depth of the rotor 125.

When the controller 134 determines that the rotor 125 is cutting in the second (harder) material, cutting operations of the milling machine 100 can be controlled based on the determination. Such cutting operations can be controlled, at least in part, by the controller 134, according to one or more embodiments. Optionally, the controller 134 can provide feedback to the operator, for instance, via the operator interface 137, regarding the transition. Such feedback can include characteristics of the second material, such as the type, and/or ways in which to control the milling machine 100. According to one or more embodiments, the control (by the controller 134 or via instructions to the operator) can be to control one or more cutting settings of the milling machine 100 to cut the second material. This can include achieving target cutting settings, which, as an example, can be same as those for cutting in the first material. Optionally, the control can be to reduce wear to the milling machine 100 or maintain wear on the milling machine 100 to be the same as that identified when cutting in the first material. This can include keeping the same cutting level and/or depth of the rotor 125 but decreasing rotational speed of the rotor 125 and/or decreasing travel speed of the milling machine 100 in the cutting direction (e.g., forward), as but examples. According to one or more embodiments, the control of the cutting settings can be to control the height of the rotor 125 so the rotor 125 does not cut the second material, for instance, in a case where the second material may be beneath the first material.

The vibration amplitude data and/or the vibration frequency data, for instance, saved in the memory 136, associated with the cutting of the second material can be used by the controller 134 to determine or estimate wear on milling machine 100 due to the rotor 125 cutting into the second material. For instance, the controller 134 may estimate remaining life, which may be referred to herein as life cycle, of the cutter bits currently on the rotor 125. Optionally, information pertaining to the determined life cycle of the cutting bits of the rotor 125 may be output on a display, for instance, of the operator interface 137 and/or of a back office system.

According to one or more embodiments, replacement cutting bits may be identified based on vibration amplitude data and/or the vibration frequency data associated with the rotor 125 cutting the second material or otherwise based on characteristics of the now-known second material. The recommendation information may be an estimation of when the current cutting bits will need to be or should be replaced or different cutting bits that may be more appropriate for cutting into the second material. Appropriate, in this context, can mean that the replacement cutting bits would be expected to wear less when cutting the second material, create less wear on the overall rotor 125 or overall milling machine 100, etc. Information pertaining to the replacement of the cutting bits may be output on a display, for instance, of the operator interface 137 and/or of a back office system.

INDUSTRIAL APPLICABILITY

As noted above, embodiments of the present disclosure relate to methods and systems for controlling operation of a milling machine based on vibration. Generally, such methods and systems can control operations of the milling machine based on measurements from one or more vibration sensors (e.g., accelerometers) provided in proximity to the rotor of the milling machine.

According to one or more embodiments, during a milling operation, the accelerometer can be configured to collect data, such as amplitude and/or frequency, and transmit the data to a controller. Based on the transmitted data, the controller can recognize job site conditions, which can allow an operator (automatically or manually) to achieve target machine parameters and optimizing the milling operation. Further, based on the transmitted vibration data, the controller may recommend cutter bits selections and/or replacements for a certain job site. Furthermore, based on the collected data, the system may determine life cycle of wear components, which can optimize owning and operation costs of the milling machine. Thus, as an example, the controller can recognize the job site conditions and can act on machine parameters to return what the operator set a target to be achieved. In some respects, the identification of wear (for the milling machine overall or components of the rotor such as the bearings or cutting teeth) and/or whether and when to replace wear components can be referred to or characterized as productivity. Thus, embodiments of the disclosed subject matter can identify, via vibration associated with the rotor cutting certain materials, ways in which production may be affected and ways to account for such effect.

Figure 3:
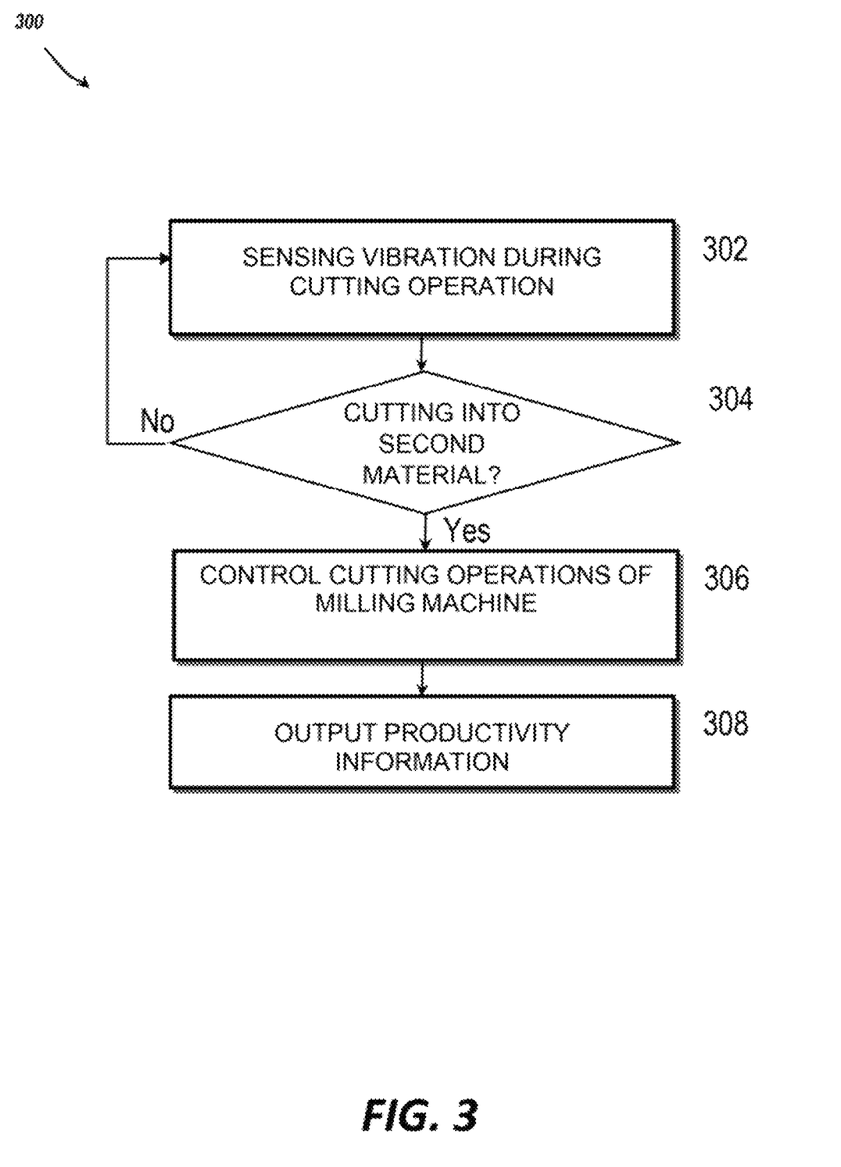
FIG. 3 is a flow chart of a method according to one or more embodiments of the disclosed subject matter.

FIG. 3 is a flow chart of a method 300 according to embodiments of the disclosed subject matter. Some or all of the method 300 can be performed via a non-transitory computer-readable storage medium (or media) having stored thereon instructions that, when executed by one or more processors, such as processor(s) of the controller 134, causes the one or more processors to perform some or all of the method 300. According to one or more embodiments, the method 300 may be referred to or characterized as a method for identifying a transition of materials for the ground surface during a cutting operation of a milling machine and/or a method for controlling operations of a milling machine based on measurements from one or more vibration sensors provided in proximity to a rotor of the milling machine.

At 302 the method 300 can include sensing vibrations associated with a cutting operation of the rotor 125 of the milling machine 100. The sensing can be performed in real time using one or more vibration sensors 135, which, as noted above, may be an accelerometer. Vibration data can be sent from the vibration sensor 135 to the controller 134.

At 304 the method 300 can include determining or identifying whether the rotor 125 is cutting into a relatively harder material of the ground surface 102. This can represent a transition from cutting in one material to now cutting in the relatively hard material (also referred to herein as the second material).

The determination of cutting in the second material, for instance, the transition from cutting a first material to cutting the second material, can be performed by the controller 134 based on the vibration data from the vibration sensor 135. As noted above, the vibration data can include or otherwise be processed (e.g., by the controller 134) to acquire vibration amplitude data and/or vibration frequency data associated with operation of the rotor 125 during the cutting operation, including the transition from cutting the first material to cutting the second material.

If the method 300, at 304, determines that the rotor 125 is cutting into the second material, at 306 cutting operations of the milling machine 100 can be controlled based on the determination. Such cutting operations can be controlled, at least in part, by the controller 134, according to one or more embodiments. Optionally, the controller 134 can provide feedback to the operator, for instance, via the operator interface 137, regarding the transition. Such feedback can include characteristics of the second material, such as the type, and/or ways in which to control the milling machine 100. According to one or more embodiments, the control (by the controller 134 or via instructions to the operator) can be to control one or more cutting settings of the milling machine 100 to cut the second material. This can include achieving target cutting settings, which can be same as those for cutting in the first material. Optionally, the control can be to reduce wear to the milling machine 100 or maintain wear on the milling machine 100 to be the same as that identified when cutting in the first material. This can include keeping the same cutting level and/or depth of the rotor 125 but decreasing rotational speed of the rotor 125 and/or decreasing travel speed of the milling machine 100 in the cutting direction (e.g., forward), as but one example. According to one or more embodiments, the control of the cutting settings can be to control the height of the rotor 125 so the rotor 125 does not cut the second material, for instance, in a case where the second material may be beneath the first material.

At 308 the method 300 can include determining and outputting productivity information. Productivity information may be or include control information regarding control of the milling machine 100 in terms of productivity based on the second material and/or determining and outputting wear-related information for the milling machine 100 based on the cutting of the second material.

For example, vibration amplitude data and/or the vibration frequency data, for instance, saved in the memory 136, associated with the cutting of the second material can be used by the controller 134 to determine or estimate wear on milling machine 100 due to the rotor 125 cutting into the second material. As but one example, the controller 134 may estimate remaining life, which may be referred to herein as life cycle, of the cutter bits currently on the rotor 125. Optionally, information pertaining to the determined life cycle of the cutting bits of the rotor 125 may be output on a display, for instance, of the operator interface 137 and/or of a back office system.

According to one or more embodiments, at 308 the method 300 can include determining replacement cutting bits either based on vibration amplitude data and/or the vibration frequency data associated with the rotor 125 cutting the second material or otherwise based on characteristics of the now-known second material. The recommendation information may be an estimation of when the current cutting bits will need to be or should be replaced or different cutting bits that may be more appropriate for cutting into the second material. Appropriate, in this context, can mean that the replacement cutting bits would be expected to wear less when cutting the second material, create less wear on the overall rotor 125 or overall milling machine 100, etc. Information pertaining to the replacement of the cutting bits may be output on a display, for instance, of the operator interface 137 and/or of a back office system.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

The functionality of the elements disclosed herein may be implemented using circuitry or processing circuitry which includes general purpose processors, special purpose processors, integrated circuits, ASICs ("Application Specific Integrated Circuits"), conventional circuitry and/or combinations thereof which are configured or programmed to perform the disclosed functionality. Processors are considered processing circuitry or circuitry as they include transistors and other circuitry therein. The processor may be a programmed processor which executes a program stored in a memory. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

Further, as used herein, the term "circuitry" can refer to any or all of the following: (a) hardware-only circuit implementations (such as implementations in only analog and/or digital circuitry); (b) to combinations of circuits and software (and/or firmware), such as (as applicable): (i) a combination of processor(s) or (ii) portions of processor(s)/software (including digital signal processor(s)), software and memory(ies) that work together to cause an apparatus, such as a mobile phone or server, to perform various functions); and (c) to circuits, such as a microprocessor(s) or a portion of a microprocessor(s), that require software or firmware for operation, even if the software or firmware is not physically present. This definition of "circuitry" can apply to all uses of this term in this application, including in any claims. As a further example, as used in this application, the term "circuitry" can also cover an implementation of merely a processor (or multiple processors) or portion of a processor and its (or their) accompanying software and/or firmware.

Use of the terms "data," "content," "information" and similar terms may be used interchangeably, according to some example embodiments of the present disclosure, to refer to data capable of being transmitted, received, operated on, and/or stored. The term "network" may refer to a group of interconnected computers or other computing devices. Within a network, these computers or other computing devices may be interconnected directly or indirectly by various means including via one or more switches, routers, gateways, access points or the like.

Aspects of the present disclosure have been described above with reference to flowchart illustrations and/or block diagrams of methods, apparatus (systems) and computer program products according to embodiments of the present disclosure. In this regard, the flowchart and block diagrams in the Figures illustrate the architecture, functionality, and operation of possible implementations of systems, methods, and computer program products according to various embodiments of the present disclosure. For instance, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It also will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

It must be noted that, as used in the specification and the appended claims, the singular forms "a," "an," and "the" include plural referents unless the context clearly dictates otherwise. That is, unless clearly specified otherwise, as used herein the words "a" and "an" and the like carry the meaning of "one or more." Additionally, it is to be understood that terms such as "left," "right," "top," "bottom," "front," "rear," "side," "height," "length," "width," "upper," "lower," "interior," "exterior," "inner," "outer," and the like that may be used herein, merely describe points of reference and do not necessarily limit embodiments of the disclosed subject matter to any particular orientation or configuration. Furthermore, terms such as "first," "second," "third," etc., merely identify one of a number of portions, components, points of reference, operations and/or functions as described herein, and likewise do not necessarily limit embodiments of the disclosed subject matter to any particular configuration or orientation.

While aspects of the present disclosure have been particularly shown and described with reference to the embodiments above, it will be understood by those skilled in the art that various additional embodiments may be contemplated by the modification of the disclosed machines, assemblies, systems, and methods without departing from the spirit and scope of what is disclosed. Such embodiments should be understood to fall within the scope of the present disclosure as determined based upon the claims and any equivalents thereof.

The invention claimed is:

1. A cold planer comprising:
   a rotor supported by a frame of the cold planer;
   a rotor housing, supported by the frame of the cold planer, to house the rotor at least partially within an internal volume of the rotor housing;
   an accelerometer to sense vibrations associated with a cutting operation of the rotor, the accelerometer being disposed adjacent to the rotor, on the rotor housing but outside of the internal volume of the rotor housing, where during the cutting operation the cold planer is moving in a cutting direction; and
   circuitry operatively coupled to the accelerometer and the rotor and configured to
      receive vibration amplitude data and vibration frequency data from the accelerometer during the cutting operation of the rotor,
      with the vibration amplitude data and/or vibration frequency data at or above a first predetermined level indicating that the cutting operation is being performed with respect to a first material, determine whether the vibration amplitude data and/or the vibration frequency data spikes above a second predetermined level indicating that the cutting operation is being performed with respect to a second material harder than the first material,
      identify the second material based on the vibration amplitude data and/or the vibration frequency data above the second predetermined level, and
      control cutting settings of the cold planer based on the identified second material to achieve a target cutting setting for the cutting operation in the second material,
   wherein the second predetermined level is based on a speed of travel of the cold planer in the cutting direction during the cutting operation and a rotational speed of the rotor during the cutting operation occurring at a same time, and
   wherein the target cutting setting for the cutting operation in the second material is the same as a target cutting setting for the cutting operation in the first material and includes a same depth of cut for the rotor.

2. The cold planer according to claim 1, wherein the first material is asphalt and the second material is concrete.

3. The cold planer according to claim 1, wherein the first predetermined level and the second predetermined level each change based on the speed of travel of the cold planer in the cutting direction and the rotational speed of the rotor during the cutting operation.

4. The cold planer according to claim 1, wherein the target cutting setting for the cutting operation in the second material includes settings for one or more of the speed of travel of the cold planer in the cutting direction, cutting level or depth of the rotor, and rotational speed of the rotor.

5. The cold planer according to claim 1, wherein the circuitry is configured to recommend replacement cutter bits for the rotor that are different from current cutter bits of the rotor based on the second material identified by the circuitry.

6. The cold planer according to claim 1, further comprising computer-readable memory,
   wherein the vibration amplitude data and the vibration frequency data from the accelerometer are saved in the computer-readable memory, and the vibration amplitude data and/or the vibration frequency data in the computer-readable memory are accessed by the circuitry to estimate a life cycle of cutter bits provided on the rotor, and
   wherein the circuitry is configured to output the estimate of the life cycle of the cutter bits for display on a display.

7. A method comprising:
   sensing, in real time, using a vibration sensor disposed relative to a rotor of a milling machine, vibration associated with a cutting operation of the rotor of the milling machine, said sensing using the vibration sensor including sensing vibration amplitude and/or vibration frequency associated with the cutting operation of the rotor;
   determining during the cutting operation, using a processor, in real time, whether the sensed vibration associated with the cutting operation of the rotor indicates a change in material hardness of material being cut by the rotor during the cutting operation based on vibration data from said sensing the vibration, the change in material hardness being above a predetermined hardness threshold amount, said determining including determining whether the vibration amplitude and/or the vibration frequency spikes above respective predetermined levels indicating the change in material hardness; and
   controlling, using the processor, cutting operations of the milling machine under a condition where said determining indicates the change in the material hardness,
   wherein said controlling the cutting operations includes controlling speed of the milling machine moving in a cutting direction, cutting level and/or depth of the rotor, and/or rotational speed of the rotor,
   wherein said determining includes identifying that the change in material hardness represents a change from a first material to a second material harder than the first material, and
   wherein a target cutting setting for the cutting operation in the second material is the same as a target cutting setting for the cutting operation in the first material and includes a same depth of cut for the rotor.

8. The method according to claim 7, further comprising:
determining, using the processor, replacement cutter bits for the rotor that are different from current cutter bits of the rotor based on the identified second material; and
outputting, using the processor, information identifying the determined replacement cutter bits for display on a display.

9. The method according to claim 7, further comprising estimating, using the processor, a life cycle of cutter bits provided on the rotor based on the vibration data from said sensing the vibration.

10. The method according to claim 7, wherein the predetermined hardness threshold amount is based on the speed of the milling machine moving in the cutting direction during the cutting operation and/or the rotational speed of the rotor during the cutting operation.

11. The method according to claim 7, wherein said determining whether the sensed vibration associated with the cutting operation of the rotor indicates the change in material includes comparing a vibration pattern associated with said sensing with one or more historical vibration patterns retrieved from a memory of the milling machine.

12. A non-transitory computer-readable storage medium having stored thereon instructions that, when executed by one or more processors, causes the one or more processors to perform a method comprising:
receiving vibration data from a vibration sensor disposed relative to a rotor of a milling machine, the vibration sensor sensing vibration associated with a cutting operation of the rotor of the milling machine;
determining during the cutting operation that the cutting operation has transitioned from the rotor cutting a first material to the rotor cutting a second material that is harder than the first material by a predetermined hardness threshold amount; and
controlling cutting operations of the milling machine responsive to said determining indicating that the cutting operation has transitioned from the rotor cutting the first material to the rotor cutting the second material,
wherein said controlling the cutting operations of the milling machine includes controlling a speed of the milling machine moving in a cutting direction, a cutting level or a depth of the rotor, and/or a rotational speed of the rotor, and
wherein said determining that the cutting operation has transitioned from the rotor cutting the first material to the rotor cutting the second material occurs under a condition that spikes of vibration amplitude and/or spikes of vibration frequency above a predetermined vibration value are identified to be greater in number than a predetermined number of spikes.

13. The non-transitory computer-readable storage medium according to claim 12, wherein the method further comprises:
identifying the second material; and
determining replacement cutter bits for the rotor that are recommended for the identified second material.

14. The non-transitory computer-readable storage medium according to claim 12, wherein the predetermined hardness threshold amount changes based on the speed of the milling machine moving in the cutting direction during the cutting operation and/or the rotational speed of the rotor during the cutting operation.

15. The non-transitory computer-readable storage medium according to claim 12, wherein the method further comprises estimating a life cycle of cutter bits provided on the rotor based on the vibration data.

16. The non-transitory computer-readable storage medium according to claim 12, wherein said determining that the cutting operation has transitioned from the rotor cutting the first material to the rotor cutting the second material includes comparing a vibration pattern associated with the received vibration data to one or more historical vibration patterns.

17. The non-transitory computer-readable storage medium according to claim 12,
wherein the vibration data includes vibration amplitude data and vibration frequency data, and
wherein the method further comprises identifying the first material prior to said determining that the cutting operation has transitioned from the rotor cutting the first material to the rotor cutting the second material.

\* \* \* \* \*